United States Patent [19]

Stanford

[11] Patent Number: 4,728,233
[45] Date of Patent: Mar. 1, 1988

[54] DEVICE AND METHOD FOR SHAPING AN ARCUATE EDGE

[76] Inventor: Alton L. Stanford, 9 Willow La., Stafford, Va. 22554

[21] Appl. No.: 853,923

[22] Filed: Apr. 21, 1986

[51] Int. Cl.⁴ .............................................. B23D 5/02
[52] U.S. Cl. ...................................... 409/293; 30/310; 83/869; 409/303; 409/313; 409/348
[58] Field of Search ........ 409/293, 308, 348, 303–305, 409/309, 310, 313, 297; 30/300, 310; 83/861, 869, 591, 596

[56] References Cited

U.S. PATENT DOCUMENTS

| | | | |
|---|---|---|---|
| 330,261 | 11/1885 | Paul | 409/313 |
| 529,428 | 11/1894 | Thomlinson et al. | 409/313 X |
| 1,994,316 | 3/1935 | Linn | 409/303 |
| 3,921,480 | 11/1975 | Ball | 83/861 |
| 4,050,336 | 9/1977 | Stubbings | 30/300 X |

Primary Examiner—Gil Weidenfeld
Assistant Examiner—Steven C. Bishop
Attorney, Agent, or Firm—Cushman, Darby & Cushman

[57] ABSTRACT

A shaping or cutting device for accurately and incrementally shaping the arcuate edges of the teeth of packing segments used as seals between turbine stage diaphragms. The device assures that the reshaped packing teeth provide uniform clearance by the seals between stage diaphragms thereby maintaining efficiency between the higher to lower pressure stages of the turbine. The device includes a positioning jig to hold the packing segments. A pivoting cutting tool is itself vertically and horizontally positionable relative to the jig. By relatively positioning the jig and cutting tool, cutting can be incrementally adjusted to uniformly shape each arcuate edge of packing teeth.

5 Claims, 14 Drawing Figures

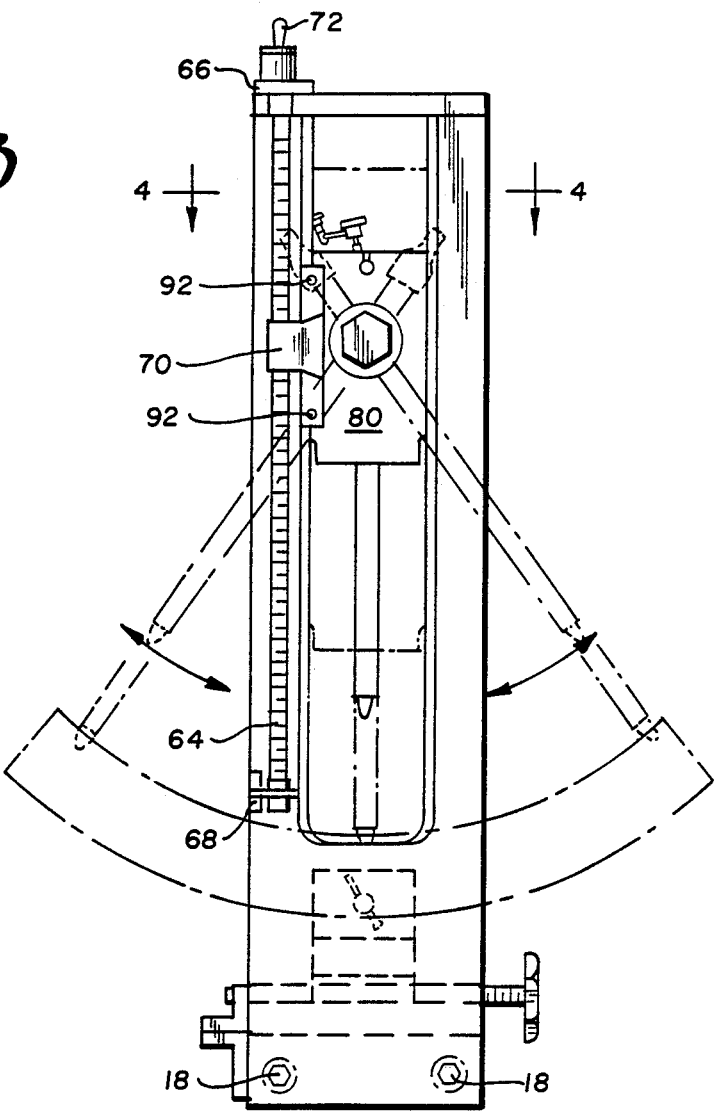
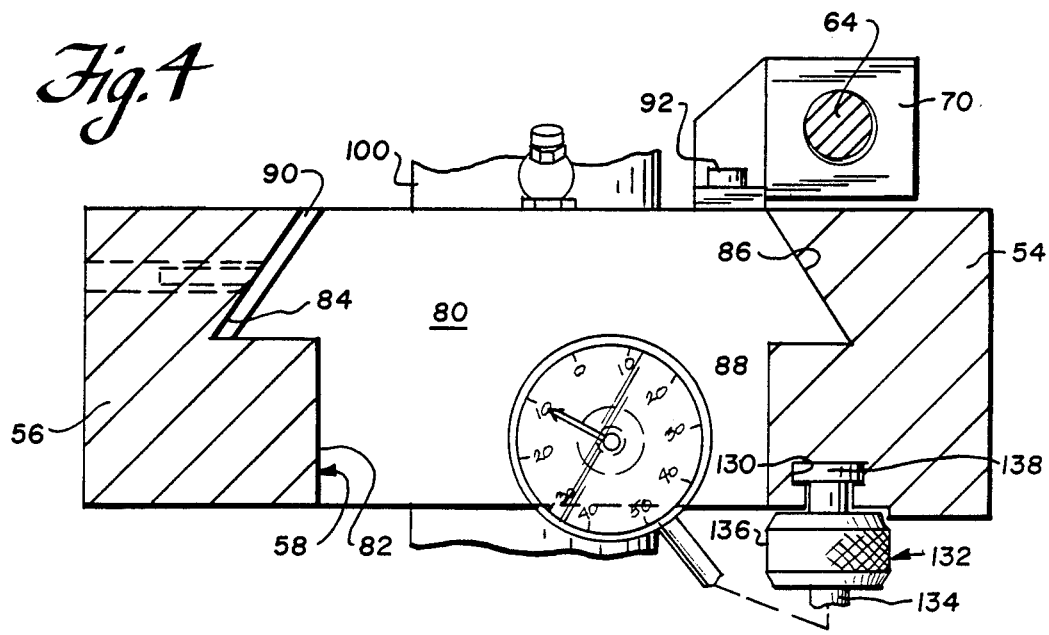

Fig.5
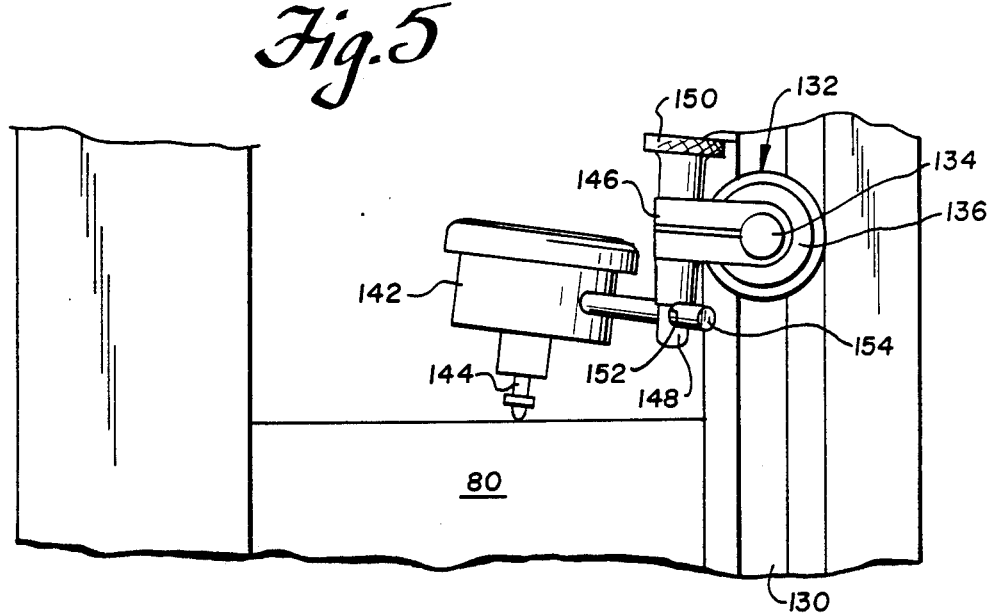
Fig.6a
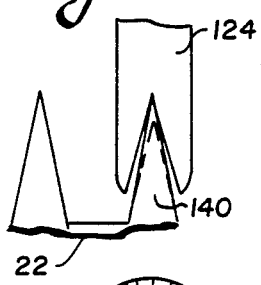
Fig.6b
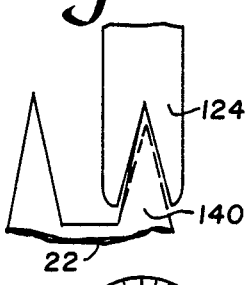
Fig.6c
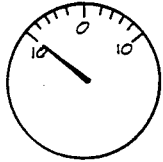
Fig.6d
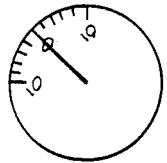
Fig.6e
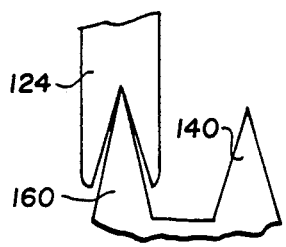
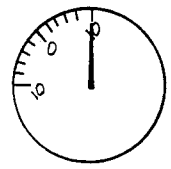
Fig.6f
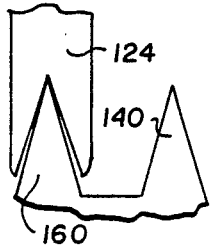
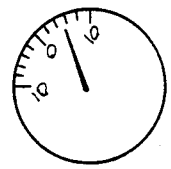
Fig.6g
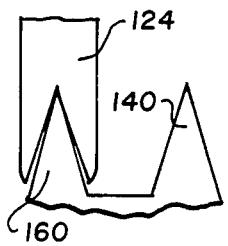
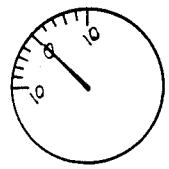
Fig.6h
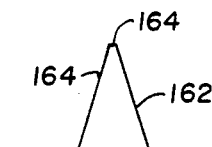

DEVICE AND METHOD FOR SHAPING AN ARCUATE EDGE

FIELD OF THE INVENTION

The present invention relates to a shaping device and method for shaping an arcuate edge, specifically the arcuate interior edges of the teeth of turbine packing segments used in turbines as seals between turbine stage diaphragms.

BACKGROUND OF THE PRESENT INVENTION

The interior of steam turbine housings are comprised, at least in part, of secured surfaces in the form sealing ribs. These ribs are formed on the surface of arcuate members that are secured to the interior of the housing so that when fully constructed, circumferentially extending seals are formed about the turbine housing and between the stage diaphragms thereof. The ribs are comprised of radially inwardly extending members, usually exhibiting a tapering cross-section which terminates at a sharp arcuate interior edge. These edges wear down in use as high pressure steam passes over them and occasionally the wear is non-uniform. Accordingly, the edges must, on occasion, be reconditioned. In the past such reconditioning has been done by a hand operation where the interior arcuate edge is hand scraped. Since this scraping process involves the reshaping of a plurality of arcuate ribs or teeth, each of the plurality of teeth needs to be reshaped in a uniform manner so that when the packings are used, high pressure steam will pass over the seals uniformly. Accordingly, correct flow of fluids through the turbine requires these sealing teeth or ribs to be at the same heights. To the extent reshaping, reconditioning or wear is non-uniform, the flow of fluid through the turbine will be adversely affected. Further, proper clearance between the seals and the various turbine stages is essential. Unless proper clearance of these seals between turbine stage diagrams is maintained, steam will leak through and along the shaft from the higher to lower pressure stages of the turbine resulting in lost efficiency.

The current method of reconditioning, reshaping or reforming these arcuate edges by hand typically requires a mechanic to lock a section of the packing in a bench vice and then, with a handheld cutter or scraper, make successive scrapes or cuts along each arcuate tooth edge in the packing. It is, of course, very difficult to accurately gauge how much hand cutting or shaping will provide a consistent and uniform tooth shape. However, in an attempt to provide some degree of control, the mechanic will use a hand held scale to try and determine, on a periodic basis at least, how much had actually removed from each tooth and to gauge how much to remove to have each tooth at an equal height.

There can only be limited control over a hand-held scraping device and it is often very possible to alternate between light and heavy strokes or cuts. The top edge of the tooth is thin and under alternating pressure conditions or because of lateral pressure the top edge may tear away allowing the cutter to slip off the tooth. This will clearly damage that tooth and its edge and perhaps the entire packer segment. To repair such a broken tooth or teeth and to have all teeth in the completed installed ring formed from the segments reshaped at uniform heights, would then require a great amount of additional hand effort and more frequent checking of tooth heights. Packing teeth resulting from this hand shaping also have razor sharp edges which could result in injury to the mechanic in those instances where a packing tooth would break and the cutter slipped.

Another problem with the hand shaping concerns the use of a cutter style where a wire edge is formed at the peak of each tooth. The formation of such a wire edge not only makes it more difficult to measure exactly how much material was being cut away, as the wire edge may or may not roll over or collapse when the measuring device was tightened in place, it might break off during measuring or worse it might break off after the seal was installed in the turbine.

Such control difficulties in the use of hand held cutting tool made accurate cutting difficult, provided little control over the actual depth of cut and resulted in improper clearances between the finished scraped segments. Further, the arc when scraped could be inconsistent, and it was difficult to obtain the desirable level of repeatability in the reconditioning process from tooth to tooth as well as from segment to segment. All of this might as well result in either improper clearances, or in service problems associated with misshapen or non-uniformly reshaped teeth.

I am aware of several devices used to clean the doors of coke ovens that use a pivoting type of scraping element as in Lindgren, U.S. Pat. No. 3,990,948, Jorzenink et al., U.S. Pat. No. 4,135,987, McCullough, U.S. Pat. No. 3,696,004 and Stanke et al., U.S. Pat. No. 3,741,806. However, none of these devices suggest the present invention nor do they suggest either the structure of the device and its mounting means, nor do they suggest how to accurately cut and recondition the arcuate edge of teeth in packing sections used in turbines.

Armstrong et al., U.S. Pat. No. 3,621,506 shows a device for scraping the interior of conduits or cylindrical sleeves wherein two scraper blades are mounted oppositely from one another on the opposite sides of a central mounting shaft with the cutting blades themselves supported by a plurality of springs, with cutting occuring when the shaft is rotated.

SUMMARY OF THE PRESENT INVENTION

The device described herein is designed to hold both a pivotable cutter tool and a packing element so that each can be positioned relative to the other. The cutter tool is also vertically and horizontally adjustable. This device permits an operator to accurately, uniformly and in a repeatable manner, shape the teeth in a plurality of packer segments and to accurately determine and control the amount of metal removed so that all the reshaped teeth in each segment and in a plurality of segments are uniform in size. The device assures uniform tooth height of each of the plurality of teeth within each packer segment and within each circumferentially extending section within the turbine housing. Similarly, it will assure that the radius of each tooth is the same. The reconditioning can also be repeated from element to element. The device further reduces the safety hazard associated with hand-held scraping tools. By assuring the correct depth of cut, the arc formed following scraping will be consistent from tooth to tooth within each element, and the resulting clearance developed with the turbine will be uniform and repeatably obtained. Since the cutting tool will be pivoted through a precise cutting stroke, side to side or lateral pressures will be eliminated so that teeth will not be torn as cutting pressure is applied to the tool during cutting strokes and each cut will be uniform along a predefined arc.

The device includes a frame member having a bottom portion and an upstanding portion although a C-shaped frame or a frame shape other than the preferred L-shaped frame could be employed so long as the cutting tool can be positioned relative to the work piece. A multi-positional jig is provided on the bottom portion for both holding a packing segment or work piece and for positioning that packing segment relative to that bottom frame portion. A separate cutting tool is pivotally mounted upon an arm with the arm being itself slidably mounted within a slide block vertically movable within or relative to the upstanding or upper portion of the frame. The mounting arm for the tool can be horizontally positioned with respect to the mounting block and incremental adjusting means for the mounting block can move the tool upward and downward. In addition, the cutting tool itself is movable with respect to the mounting arm so that the pivot axis of the tool and the arc to be used for scraping can be varied as is necessary or desired.

The tool also includes a zeroing assembly to allow a zero or starting point to be consistently established for the first and subsequent teeth being cut.

Other objects, features, and characteristics of the present invention, as well as the methods and operation and functions of the related elements of the structure, and to the combination of parts and economies of their manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 3 is a rear elevational view of the apparatus shown in FIG. 1;

FIG. 4 is a partial cross-section view taken along the line 4—4 in the FIG. 3;

FIG. 5 is a partial side elevational view of the zeroing mechanism shown in FIGS. 3 and 4;

FIGS. 6a–6h show the progression of steps used for initially centering the zeroing device, the shaping of a first tooth, and the incremental and progressive shaping of a second tooth, including an enlarged view of the final tooth shape.

DETAILED DESCRIPTION OF THE PREFERRED EXEMPLARY EMBODIMENT OF THE PRESENT INVENTION

Figure 1A:
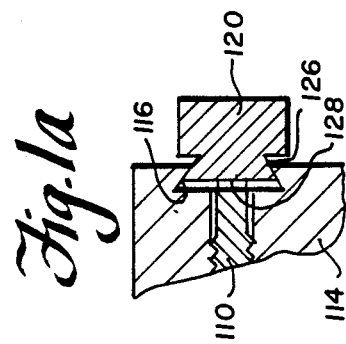
Figure 1a is a partial cross section taken along line a—a in FIG. 1.
Figure 1:
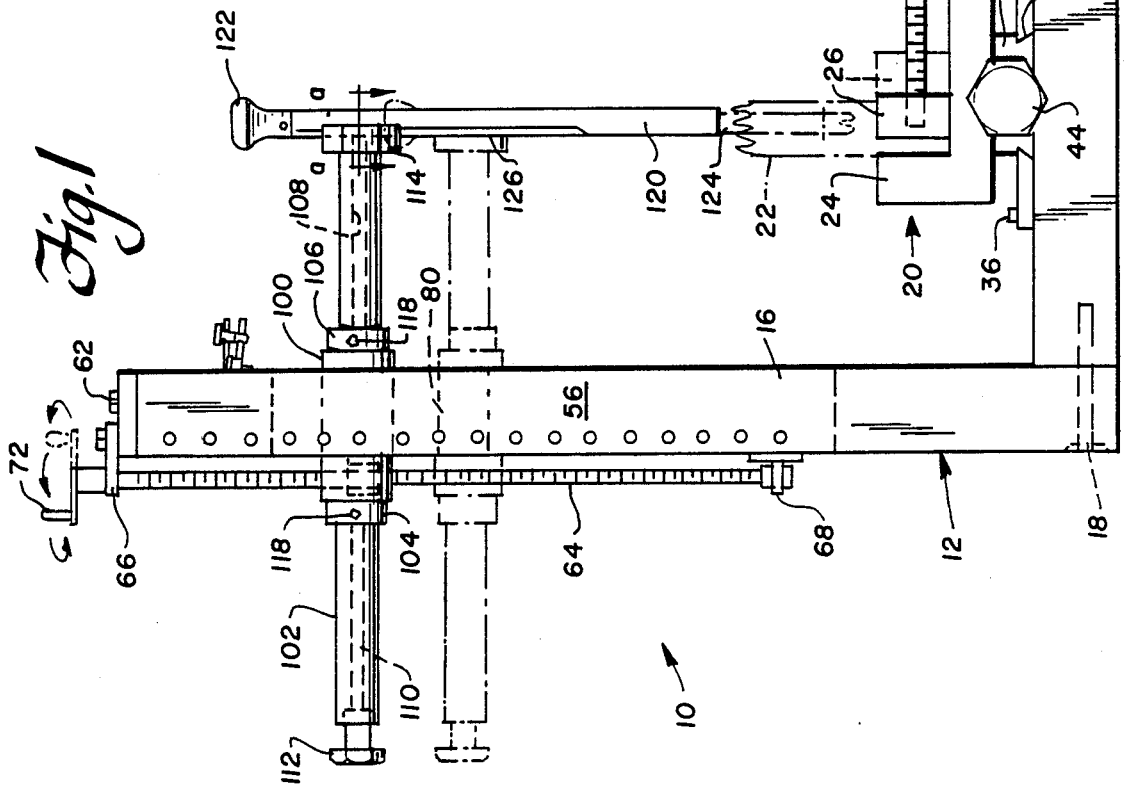
FIG. 1 is a diagrammatic side elevational view of the apparatus according to the present invention.

Turning now to FIG. 1, the shaping device is generally indicated at 10 and is comprised of a frame 12 having a horizontal base portion 14 and a vertical portion 16 with these portions being held together by any convenient means, such as bolts 18.

Mounted on the horizontal base 14 is a jig assembly, generally indicated at 20, for holding a packing segment or workpiece 22 thereon as is shown in phantom. This jig 20 is comprised of a U-shaped jaw member 24 in which a movable jaw member 26 is slidably received with the movable jaw 26 attached to a screw 28 that threadably engages one of the upstanding ends of U-shaped jaw 24. The U-shaped jaw member 24 includes a base member 30 the bottom of which is dovetailed, as at 32, the latter being held by a pair of spaced apart mounting plates 34 that include complimentary sloped or angled faces corresponding to the shaped dovetail 32. Plates 34 are held to base 14 by screws 36. Preferably the pair of mounting plates 34 include elongated slots through which screws 36 extend so that plates 34 can move horizontally toward and away from the position as shown in FIG. 1.

In addition, base 30 includes a threaded bore in which screw 38 is received with one end of screw 38 being rotatably held within a bracket 40 which is secured to base 14 as for example by screws 42. Screw 38 will be rotatable but not axially movable. The other end of screw 38 includes a knob 44. When mounting plates 34 are loosened, rotation of knob 44 will turn screw 38 within base 30 of jig 20 thereby moving the jig horizontally across the top surface of base 14 in the direction shown by the two arrows in FIG. 2 depending upon the clockwise or counterclockwise rotation of screw 38.

Figure 2:
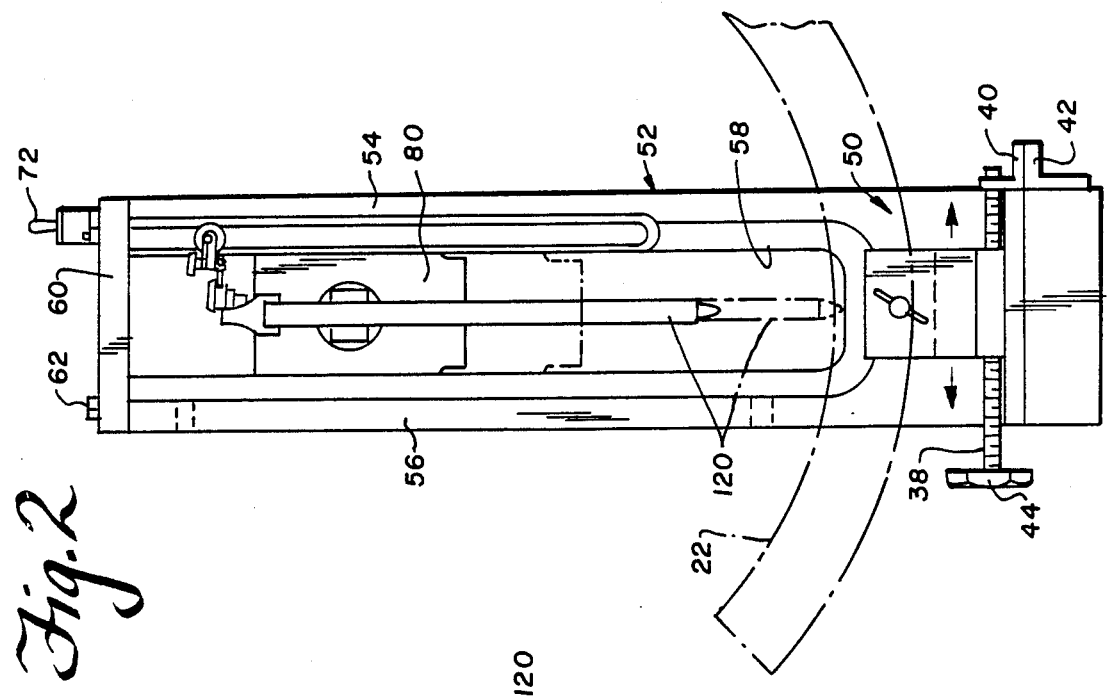
FIG. 2 is a front elevational view of the apparatus shown in FIG. 1.

With reference to FIGS. 1–3, vertical upright 16 is comprised of a solid lower portion 50, as well as an upper portion 52 defined by two spaced apart upright members 54 and 56 having a generally U-shaped opening 58 therebetween. A plate 60 extends across the top of uprights 54 and 56 and is secured to the top of each by any convenient removable means, as for example, by bolts 62. A threaded rod 64 extends along the rear of upright 54 and is rotatably secured to plate 60 by a bracket 66 and to the lower portion of upright 54 by a second bracket 68. A third bracket 70, as shown in FIG. 3, threadably receives screw 64 and is attached to a slide block 80. A handle 72 is provided at the top end of screw 64 and permits the screw to be rotated as shown by the arrows and the dotted line representation of one moved position for that handle in FIG. 1.

Sliding arm block 80 is slidably retained within the U-shaped opening 58 and with reference to FIG. 4, it can be noted that the U-shaped opening 58 includes a straight walled portion 82 and a dovetailed groove or mortised area 84.

Block 80 also includes a dovetailed tenon 86 as well as a straight walled portion 88 complementing the straight walled portion 82 of the vertical upright 16 and the dovetailed groove 84, respectively. On the left hand side, a spacing plate 90 in the form of a flat plate is inserted between sliding arm block 80 and groove 84 in order to appropriately fit the sliding block 80 within the U-shaped opening 58. Bracket 70 is itself connected to sliding block 80 by bolts or screws 92 so that as screw 64 is rotated, in either a clockwise or counterclockwise direction, the sliding block 80 will be raised or lowered, respectively.

Sliding block 80 also includes a hollow opening, such as in the form of cylinder 100 that extends therethrough and is fixed by any convenient means such as by welding or other conventional means. Cylinder 100 slidingly receives a sliding arm 102 which is held in place by means of two lockable collars 104 and 106. It should be noted that block 80 could simply be provided with a machined bore which would receive arm 102. The interior of sliding arm 102 is itself hollow and provided with a threaded interior 108 in which a threaded rod 110 is received. Knob 112 is connected to one end of threaded rod 110 and provides a convenient way of turning rod 110. Mounted at the opposite end of sliding arm 102 from knob 112 is a mounting block 114 and, as shown in FIG. 1a, is provided with a dovetailed groove 116. A cutting bar, shown at 120, is provided with a handle 122 at one end and a cutting element 124 at the opposite end. The rear face of cutting bar 120 is provided with a dovetailed tenon 126 which is slidingly received within the groove 116. As shown in FIGS. 1 and 1a, the end of threaded rod 110 opposite knob 112 extends into and through mounting block 114 so as to be directly engagable with rear face 128 of cutting bar 120. Accordingly, when knob 112 and rod 110 are rotated, rod 110 moves axially within arm 102 with clockwise rotation forcing tenon 126 firmly into groove 116 preventing further relative vertical movement between cutting bar 120 and mounting block 114.

With the above elements in mind, it is possible to position jig 20, workpiece 22 and cutting bar 120 in a variety of positions within various horizontal and vertical planes established by the mounting mechanism for jig 20. A cutting bar 120 is vertically and horizontally movable relative to arm 102 and workpiece 22, and sliding arm 102 is itself slidable with respect to the sliding arm block 80 and the latter is vertically movable within the upright 16. Accordingly, the cutting element 124 can be positioned so as to be movable in a wide variety of positions and in a perfect arc along the arcuate edge of any packing member 22.

As indicated previously, the desired end result is to incrementally shape each of the arcuate edges of ribs or teeth of a plurality of the packing segments. These progressive steps for each tooth are shown in FIGS. 6a-6g. Turning first to FIG. 6a, cutting element 124 is shown over a tooth 140 of a workpiece or packing segment 22. The full line designation shows the height of tooth 140 prior to being reconditioned or reshaped, whereas the dotted line representation shows the shaped character of the tooth following the reconditioning process.

After the segment of packing 22 has been placed in the jig 20 and has been suitably leveled or otherwise positioned and tightened, there are four separate adjustments that are made prior to performing the shaping or cutting operation. First, packing 22 must be centered under sliding arm 102 by turning knob 44. Once the packing segment is correctly positioned, bolts 36 can be securely tightened locking jig 20 in its set position.

Next, sliding arm 102 will be moved horizontally by loosening the locking collars 104 and 106, by loosening set screws 118, and horizontally positioned until cutting element 124 is positioned over a preselected tooth. Locking collars 104 and 106 can then be relocked by tightening set screws 118.

Cutting bar 120 is then moved vertically up and down to establish the radius through which cutting element 124 will move and thereby also establish the pivot axis for the cutting bar. Movement of the cutting bar can be accomplished by loosening threaded rod 110 by twisting knob 112 counterclockwise so as to move the end of rod 110 away from rear face 128. When the proper radius is established, knob 112 will again be screwed clockwise to force the end of rod 110 into contact with surface 128 thereby locking the position of cutting bar 120 with respect to arm 102.

Finally, sliding block 80 can be raised or lowered by turning handle 72 thereby turning screw 64. By incrementally turning screw 64, the cutting element 124 can be positioned and/or spaced relative to the arcuate edge to be shaped so as to establish the desired amount of contact between the cutting tool and that arcuate edge.

By combining these four adjustable elements, cutting element 124 can be correctly positioned.

The zeroing mechanism can best be understood with reference to FIGS. 4 and 5. A channel shaped slot 130 is provided in upright 54 and a lockable slider mechanism 132 as shown is positioned therein. Slider 132 is comprised of a bar 134 on which a knob 136 is threadably engaged with the rear end of bar 134 having an enlarged or T-shaped rear section 138. As the knob 136 is tightened on the threaded exterior of bar 134, the interior surface of knob 136 engage the front surface of upright 54 and the enlarged rear portion 138 will engage the inside surfaces of slot 130 locking the slider member 132 in place. A load indicator 142 having a feeler or sensing arm 144 is connected to slider 132 and in particular to bar 134 by means of a locking mechanism comprised of a clamp member 146 through which a threaded rod 148 extends, with rod 148 having a knob 150 at one end engaging the threaded portion. The other end of rod 148 also includes an aperture 152 through which a rod 154 extends with rod 154 being suitably attached to an indicator 142. By inserting rod 154 through aperture 152 and turning knob 150, knob 150 will move downwardly on one side of clamp member 146 and pull rod 154 vertically upwardly relative to clamp member 146 which causes rod 154 to engage the bottom or other side of clamp 146 which in turn closes clamp 146 about bar 134. In this way, indicator 142 can be appropriately positioned relative to sliding block 80.

Once the previously described adjustments have been made, the indicator and its locking assembly, just described, can be moved within channel 130 until the sensing arm 144 touches the top of sliding arm block 80 and shows a slight load of about 0.100 and then locked in placed. The sliding block can then be vertically adjusted so that the cutting element 124 just touches or engages the top of tooth 140 as shown in FIG. 6a. The indicator can then be zeroed. This is also shown in FIG. 6a. Since cutting element 124 cuts in only one direction as it pivoted through the arc shown in FIGS. 2 and 3, progressive cuts are made by adjustments of the sliding block downwardly following each stroke as indicated in FIGS. 6b and 6c until 0.010 inches have been removed from the tooth. This will establish the final height of tooth 140 as shown in FIG. 6c and as shown at dotted lines in FIG. 6a. As shown in FIG. 6d, following the shaping of the first tooth the indicator will then be zeroed again at the completed tooth height and the cutting element 124 will be repositioned on the next tooth 160 until ten thousandths registers on the indicator as shown on FIG. 6e. Progressive cuts will be made indexing the cutting element 124 downward until the indicator again reads zero at which point the shape, size and reconditioning of the second tooth 160 will have been completed and will be identical in size and shape of tooth 140.

As shown in FIG. 6h, it should be understood that when the teeth 140 and 160 have been cut, the side walls 162 and 164 will be smooth and the very top surface will be provided with a flat surface or peak as indicated at 164 with the dimension for that flat peak being about 0.10 inches. This is a different shape for each tooth than that developed by earlier cutter devices wherein a razor thin edge would be produced which would more easily result in the packing teeth being torn or left with a ragged edge. However, with the precision and control provided by the present invention, this tooth shape can be produced thereby providing a tooth that is better able to resist wear and provide better and more efficiency functioning seals.

These cutting positions can be repeated for each tooth within each packing segment and when finished, each tooth within the packin9 segment will have a uniform height and size. In addition, the end result will produce a true arc along each of the teeth since the cutter bar 120 is lockable in a particular radius and cutting position with the cutter able to be returned to the same height in every instance, making each cut uniform. This will increase the efficiency of each packer segment within the turbine and will more effectively accomplish the tooth reshaping operation.

While the present invention has been described in connection with what is presently considered to be the most practical and preferred embodiment, it is to be understood that the invention is not to be limited to the disclosed embodiment, but rather on the contrary, is intended to cover various modifications and equivalent arrangements included within the spirit and scope of the appended claims.

What is claimed:

1. A device for sequentially shaping a plurality of concave edges of a workpiece comprising:
   a cutting tool mounted to a frame member for shaping the edges of the workpiece;
   arm means secured to said frame member for dependently mounting the cutting tool and for defining a pivot axis about which the cutting tool can reciprocally pivotally move so that said cutting tool sweeps along a concave cutting path during such movement;
   jig means attached to said frame member for rigidly holding the workpiece relative to said cutting tool such that each of the concave edges can be sequentially positioned with respect to and maintained during shaping in registered alignment with said cutting path;
   adjustment means for positionally adjusting said cutting tool relative to one of said concave edges to thereby establish a desired amount of contact therebetween whereby said one concave edge is shaped in response to pivotal movement of the positionally adjusted cutting tool; and
   means for adjusting said cutting tool relative to the other ones of said plurality of said concave edges so that each of said plurality of concave edges is substantially dimensionally identical.

2. A method of shaping a plurality of arcuate edges of a workpiece in a shaping device having a pivoting tool comprising the steps of:
   (a) securing the workpiece on the device,
   (b) establishing a relative position between the workpiece and the tool so that the tool is movable along an arcuate cutting path,
   (c) adjusting the spacing of the tool relative to one of the arcuate edges so as to establish the desired amount of contact therebetween,
   (d) pivoting the tool in a first direction so that the tool moves in contact with and along said one arcuate edge thereby shaping said one arcuate edge,
   (e) pivoting the tool in a second direction reverse to the first direction so that the tool is clear of said one arcuate edge,
   (f) repeating steps (c), (d) and (e) until the desired amount of shaping of said one arcuate edge has occurred,
   (g) sensing the quantity of cutting undertaken with said one arcuate edge, and
   (h) with each of the other ones of said plurality of edges repeating steps (b), (d), (e) and (f) in accordance with the sensed quantity of cutting from step (f) so that each edge is substantially uniformly shaped to conform to the shaping of the said one arcuate edge.

3. A device for sequentially shaping the concave arcuate interior portion of each of a plurality of adjacent teeth on a workpiece in the form of a turbine packing segment so that following shaping each tooth within said plurality of teeth will be substantially the same, said device comprising a frame assembly a multi-positional jig assembly positioned on said frame assembly to support and position the workpiece, a tool for shaping the arcuate portion of each of said plurality of teeth, mounting means for mounting said tool to said frame assembly relative to said jig assembly and for establishing a pivot axis about which the tool can pivot, means for adjusting the position of said tool relative to at least a first one of said plurality of teeth and sensing menas for sensing the adjusted position of said tool so that through the relative mutual positioning of said jig and said mounting the tool can engage and move along the length of the arcuate portion of at least a firs one of said plurality of teeth.

4. The device as in claim 3, wherein said sensing means further includes means for determining the extent of shaping undertaken with said at least one of said plurality of teeth and for permitting the remaining ones of said plurality of teeth to be shaped substantially identical thereto.

5. A device for shaping an arcuately concave portion of a workpiece comprising
   a frame assembly,
   a multi-positional jig assembly positioned on said frame assembly to support and position a workpiece including an arcuate edge portion,
   a tool for shaping the arcuate edge portion,
   mounting means for adjustably mounting said tool to said frame asembly relative to said jig assembly and for establishing th ®axis about which the tool can pivot,
   means for incrementally adjusting the relative position of said tool to said arcuate edge portion, and
   sensing means for sensing the position of said tool relative to said arcuate edge portion so that through the relative mutual positioning of said jig and said mounting menas the tool can engage and move along the length of the arcuate edge portion.

* * * * *